US011235687B2

(12) United States Patent
Will et al.

(10) Patent No.: US 11,235,687 B2
(45) Date of Patent: Feb. 1, 2022

(54) MULTI-FUNCTIONAL ENERGY ABSORBER

(71) Applicant: BRITAX CHILD SAFETY INC., Fort Mill, SC (US)

(72) Inventors: Adam Mark Will, Indian Land, SC (US); Quentin Walsh, Fort Mill, SC (US); Julien Santini, Fort Mill, SC (US)

(73) Assignee: BRITAX CHILD SAFETY INC., Fort Mill, SC (US)

( * ) Notice: Subject to any disclaimer, the term of this patent is extended or adjusted under 35 U.S.C. 154(b) by 139 days.

(21) Appl. No.: 16/451,486

(22) Filed: Jun. 25, 2019

(65) Prior Publication Data

US 2020/0009997 A1    Jan. 9, 2020

Related U.S. Application Data

(60) Provisional application No. 62/694,113, filed on Jul. 5, 2018.

(51) Int. Cl.
*B60N 2/28*    (2006.01)

(52) U.S. Cl.
CPC ......... *B60N 2/2884* (2013.01); *B60N 2/2875* (2013.01)

(58) Field of Classification Search
None
See application file for complete search history.

(56) References Cited

U.S. PATENT DOCUMENTS

| 5,551,751 | A * | 9/1996 | Sedlack | B60N 2/2821 297/216.11 |
|---|---|---|---|---|
| 5,664,830 | A * | 9/1997 | Garcia | B60N 2/2821 297/216.11 |
| 8,348,337 | B2 * | 1/2013 | Franck | B60N 2/2887 297/216.11 |
| 8,585,143 | B2 * | 11/2013 | Xiao | B60N 2/2875 297/256.16 |
| 8,998,318 | B2 * | 4/2015 | Gaudreau, Jr. | B60N 2/2872 297/256.13 |
| 2012/0146369 | A1 * | 6/2012 | Gaudreau, Jr. | B60N 2/2812 297/216.11 |
| 2012/0223558 | A1 * | 9/2012 | Wang | B60N 2/2875 297/250.1 |
| 2012/0242127 | A1 * | 9/2012 | Gaudreau, Jr. | B60N 2/2851 297/250.1 |
| 2012/0313413 | A1 * | 12/2012 | Hutchinson | B60N 2/2812 297/250.1 |

(Continued)

*Primary Examiner* — David R Dunn
*Assistant Examiner* — Christopher E Veraa
(74) *Attorney, Agent, or Firm* — K&L Gates LLP

(57) ABSTRACT

A child safety seat may include a base configured to be operably coupled to a vehicle seat, a seat shell configured to receive and secure a child therein, and a multi-functional energy absorber. The seat shell may be operably coupled to the base such that the seat shell is alternately movable between a plurality of positions relative to the base responsive to operation of a seat positioner assembly, and lockable in the plurality of positions relative to the base responsive to operation of a locking assembly. The multi-functional energy absorber may be disposed between the base and the seat shell. The multi-functional energy absorber may be an integral portion of both the seat positioner assembly and the locking assembly.

18 Claims, 18 Drawing Sheets

(56) References Cited

U.S. PATENT DOCUMENTS

| | | | |
|---|---|---|---|
| 2014/0232152 A1* | 8/2014 | Minato | B60N 2/2893 |
| | | | 297/216.11 |
| 2016/0176320 A1* | 6/2016 | Williams | B60N 2/2821 |
| | | | 297/256.13 |
| 2016/0207497 A1* | 7/2016 | Seal | B60N 2/2893 |
| 2017/0140634 A1* | 5/2017 | Mindel | B60N 2/2863 |
| 2018/0072195 A1* | 3/2018 | Mitchell | B60N 2/2821 |
| 2018/0264977 A1* | 9/2018 | Anderson | B60N 2/2821 |

* cited by examiner

MULTI-FUNCTIONAL ENERGY ABSORBER

CROSS REFERENCE TO RELATED APPLICATIONS

This application claims priority to U.S. application No. 62/694,113 filed Jul. 5, 2018, the entire contents of which are hereby incorporated by reference in their entirety.

TECHNICAL FIELD

Exemplary embodiments of the present disclosure generally relate to child safety seats, and more particularly, to a child safety seat that employs a multi-functional and/or multi-directional energy absorber.

BACKGROUND

Child safety seats (or simply child seats or car seats) are secured inside a vehicle to protect children in vehicles from the effects of either accidents, sudden deceleration, or other impacts or jarring events. The child safety seats may include various different protective features relating to securing the child safety seats in the vehicle, securing the child to the child safety seat, and protecting the child once the child is secured in the child safety seat. Some of these protective features may be prescribed by regulation in certain jurisdictions, but others may provide optional, additional protection for children. Thus, child safety seats can have a variety of different features, and even different structural arrangements for providing many of those features. Energy absorbers are one example of such features.

A typical child safety seat may include a seat portion or seat shell that defines the structure inside which the child is secured. The seat portion is typically operably coupled to a base of some sort, so that the base can support the seat portion and also be securely attached to the vehicle seat. The addition of an energy absorber has, in the past, been provided between the seat portion and the base to absorb the energy of impact so that such energy is not experienced by the child.

Energy absorbers have typically been affixed rigidly to the base, but provided with a curved upper surface to allow very limited movement of the seat portion relative to the base. While this structure has been relatively simple to design and employ, the design is effectively only useful for absorbing energy in a vertical direction. Thus, it may be desirable to provide an improved design that gives more flexibility to support movement and positioning of the seat, and more dynamic energy absorption capabilities.

BRIEF SUMMARY OF SOME EXAMPLES

Some example embodiments may enable the provision of a multi-functional and/or multi-directional energy absorber for a child safety seat.

In one example embodiment, a child safety seat is provided. The child safety seat may include a base configured to be operably coupled to a vehicle seat, a seat shell configured to receive and secure a child therein, and a multi-functional energy absorber. The seat shell may be operably coupled to the base such that the seat shell is alternately movable between a plurality of positions relative to the base responsive to operation of a seat positioner assembly, and lockable in the plurality of positions relative to the base responsive to operation of a locking assembly. The multi-functional energy absorber may be disposed between the base and the seat shell. The multi-functional energy absorber may be an integral portion of both the seat positioner assembly and the locking assembly.

In another example embodiment, a child safety seat is provided. The child safety seat may include a base configured to be operably coupled to a vehicle seat, a seat shell configured to receive and secure a child therein, and a multi-functional energy absorber. The seat shell may be operably coupled to the base such that the seat shell is alternately movable between, and lockable in, a plurality of positions relative to the base. The multi-functional energy absorber may be disposed between the base and the seat shell. The multi-functional energy absorber may be configured to absorb impact energy, provide a sliding support surface for the seat shell to enable the seat shell to be movable between the plurality of positions relative to the base, and enable locking of the seat shell in selected ones of the plurality of positions relative to the base.

In another example embodiment, a multi-directional energy absorber for a child safety seat is provided. The multi-directional energy absorber may include a coupling member configured to be affixed to a frame of a seat shell of the child safety seat, and an arcuate member operably coupled to the coupling member at respective opposing ends thereof. The arcuate member may be configured to slidingly engage a support surface of the base when the child safety seat is in an unlocked state. The seat shell may be configured to be locked at a selected position relative to the base responsive to affixing a portion of the base to the arcuate member in a locked state. The multi-functional energy absorber may be configured to absorb impact energy from more than one direction.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Figure 1:
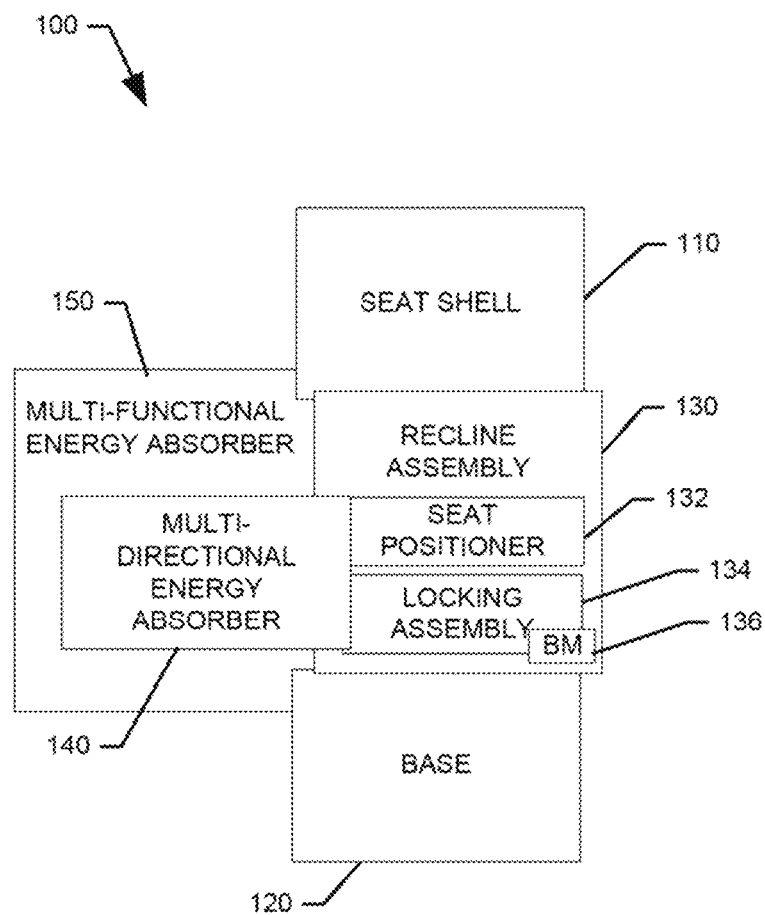
FIG. 1 illustrates a block diagram of a child safety seat according to an example embodiment.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other.

As discussed above, affixing an energy absorber to the base portion typically results in a limited usefulness for the energy absorber. Example embodiments may therefore improve the range of directions over which energy absorption can be effectively accomplished thereby effectively providing a multi-directional energy absorber. Moreover, the design of example embodiments may also result in a multi-functional energy absorber that not only provides energy absorption, but also supports more than two positions of the seat portion relative to the base while also providing structures for a locking function integrated into the energy absorber.

FIG. 1 illustrates a block diagram of a child safety seat 100 of an example embodiment. As shown in FIG. 1, the child safety seat 100 may include a seat shell 110 and a base 120. The seat shell 110 may include padding, strapping and/or other materials that allow a child to be restrained therein both comfortably and securely. The base 120 may be configured to be secured to a vehicle seat of a vehicle. The seat shell 110 may be operably coupled to the base 120 via a recline assembly 130, which enables multiple different relative positions to be defined between the seat shell 110 and the base 120.

The recline assembly 130 may include a seat positioner assembly 132 and a locking assembly 134. The seat positioner assembly 132 may be configured to allow the seat shell 110 to be moved to a plurality of positions relative to the base 120. In some cases, the plurality of positions may enable the seat shell 110 to be pivoted, rotated or slid to a number of intermediate positions in between respective opposite end positions. In an example embodiment, one of the end positions may be a substantially vertical position where there is no recline (e.g., where the child is supported with its upper torso nearly vertical and its femurs nearly horizontal) and a substantially horizontal position where there is a full recline (e.g., where the head and knees of the child are nearly in the same horizontal plane or where the head and the torso are nearly horizontal).

As noted above, multiple other positions may be defined between the full recline and the zero recline position as well. In order to enable the recline assembly 130 to be locked or otherwise retained in any particular position, the locking assembly 134 may be employed. In this regard, the locking assembly 134 may be configured to provide one or more structures to enable a locking of the seat shell 110 relative to the base 120 after the seat shell 110 has been moved to a particular position using the seat positioner assembly 132. In some cases, the locking assembly 134 may be biased in either a locked or unlocked position using a biasing member 136.

The child safety seat 100 may also include a multi-directional energy absorber 140 that is configured to provide energy absorption for impacts in directions other than simply a single direction (i.e., the vertical direction). In this regard, the multi-directional energy absorber 140 may be configured to interface with the recline assembly 130 (and particularly with the seat positioner assembly 132) to support the seat shell 110 in each of the plurality of positions, and provide energy absorption for impacts in multiple directions. Of note, the fact that the multi-directional energy absorber 140 interfaces with the seat positioner assembly 132 to provide support for the seat shell 110 over a full range of motion of the seat shell 110 means that the multi-directional energy absorber 140 is effectively multi-functional in nature. In this regard, the multi-directional energy absorber 140 not only provides energy absorption (multi-directionally), but also provides a support surface for repositioning of the seat shell 110 relative to the seat base 120. However, in accordance with an example embodiment, the multi-directional energy absorber 140 may also interface with the locking assembly 134 to provide a structure for locking of the seat shell 110 relative to the base 120. As such, the multi-directional energy absorber 140 may effectively have a third function (i.e., a locking function).

In accordance with an example embodiment, beyond merely interfacing with the seat positioner assembly 132 and the locking assembly 134, the multi-directional energy absorber 140 may actually be integrated into such assemblies. In other words, the multi-directional energy absorber 140 may be an integral part of each of the seat positioner assembly 132 and the locking assembly 134. As such, the multi-directional energy absorber 140 may effectively define a multi-functional energy absorber 150 (as shown in FIG. 1), which performs at least three functions with the structures that are integrated therein. The three functions may include an energy absorption function between the seat shell 110 and the base 120, a sliding and support surface for reclining of the seat shell 110 relative to the base 120, and a locking function to lock the seat shell 110 in respective different positions relative to the base 120. Thus, it should be understood that some example embodiments may include the multi-functional energy absorber 150 where the multi-directional energy absorber 140 is replaced with an energy absorber that is not necessarily multi-directional. Some alternative example embodiments may include the multi-directional energy absorber 140, and the multi-directional energy absorber 140 may not necessarily be integrated into the locking assembly 134 and the seat positioner assembly 132 such that less than the three functions described above are performed by the multi-directional energy absorber 140. As such, in some cases, the multi-directional energy absorber 140 and the multi-functional energy absorber 150 could effectively be the same component. Accordingly, with the potential substitutions/modifications discussed above being understood, the component will hereinafter be referred to interchangeably as the multi-directional energy absorber 140 or multi-functional energy absorber 150.

Figure 2:
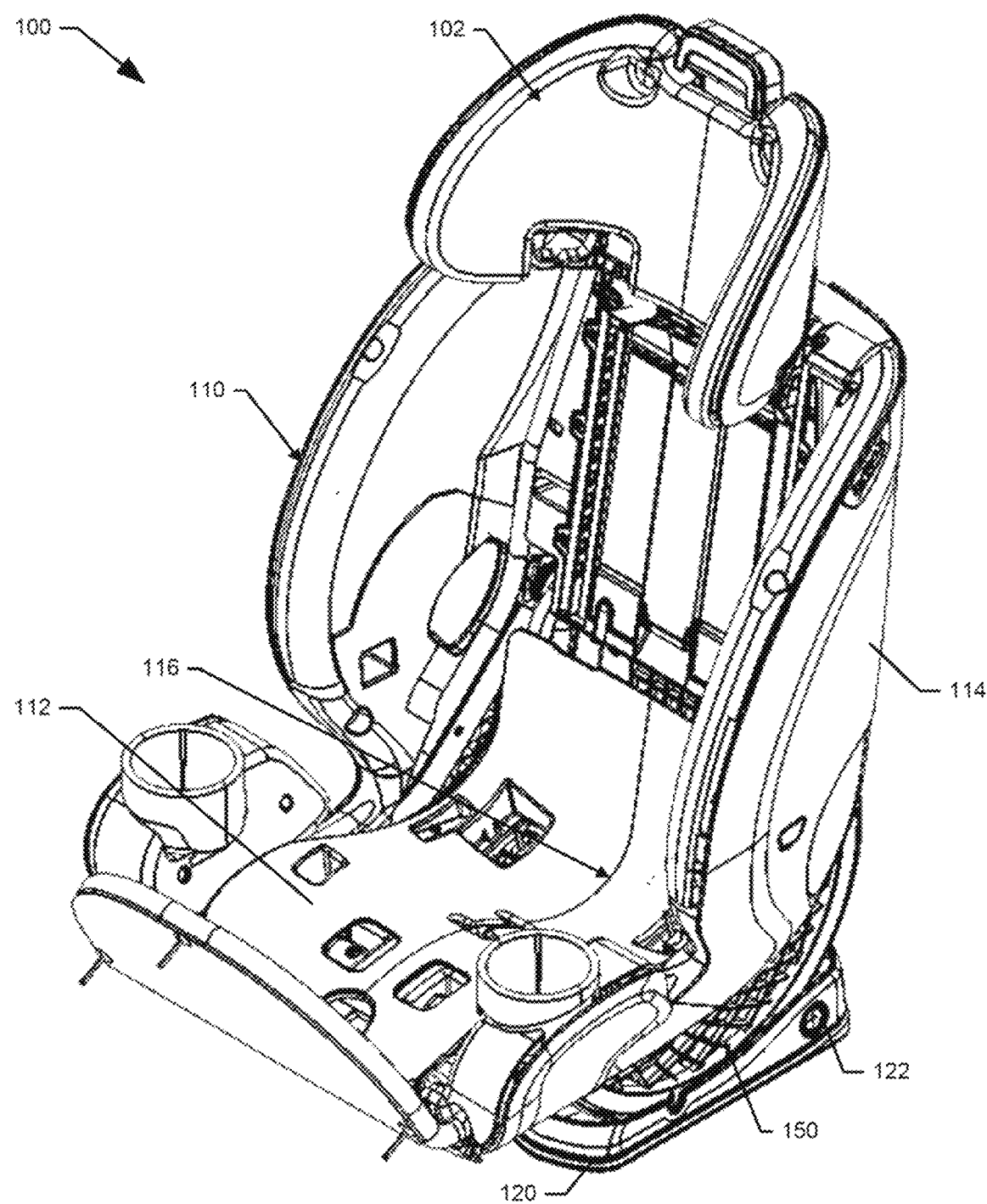
FIG. 2 is a front perspective view of the child safety seat according to an example embodiment.
Figure 3:
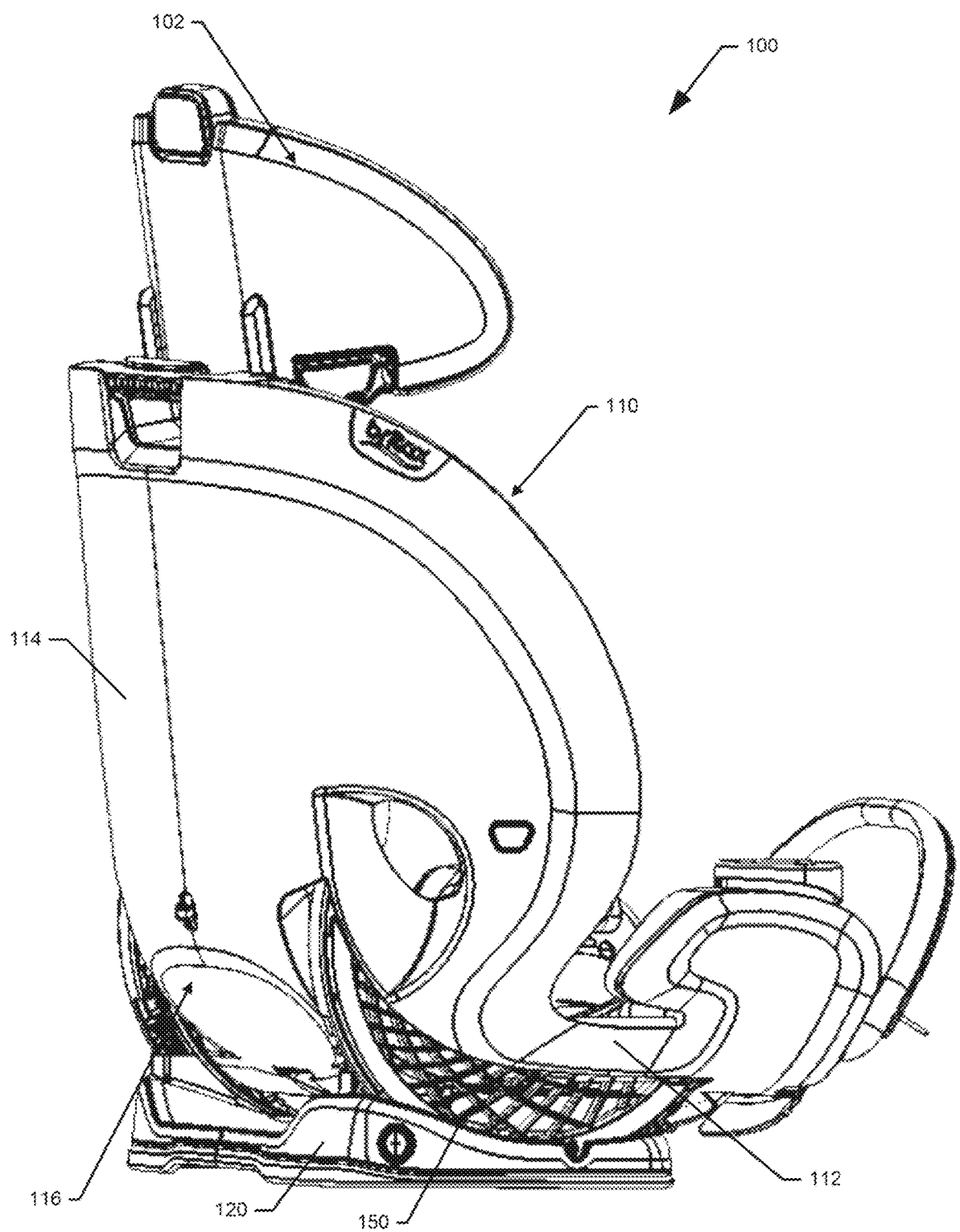
FIG. 3 is a rear perspective view of the child safety seat according to an example embodiment.
Figure 4:
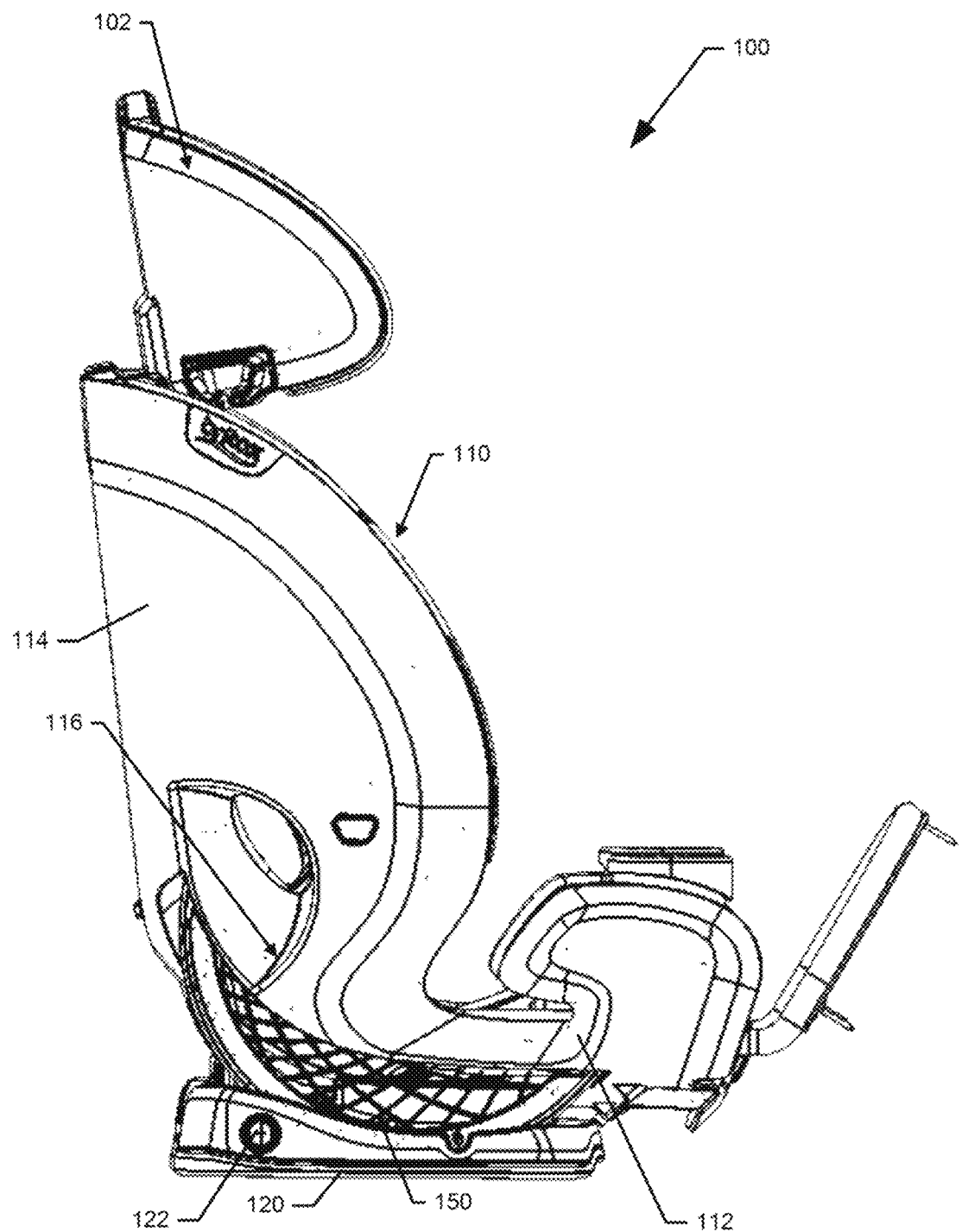
FIG. 4 is a right side view of the child safety seat in the no recline position according to an example embodiment.
Figure 5:
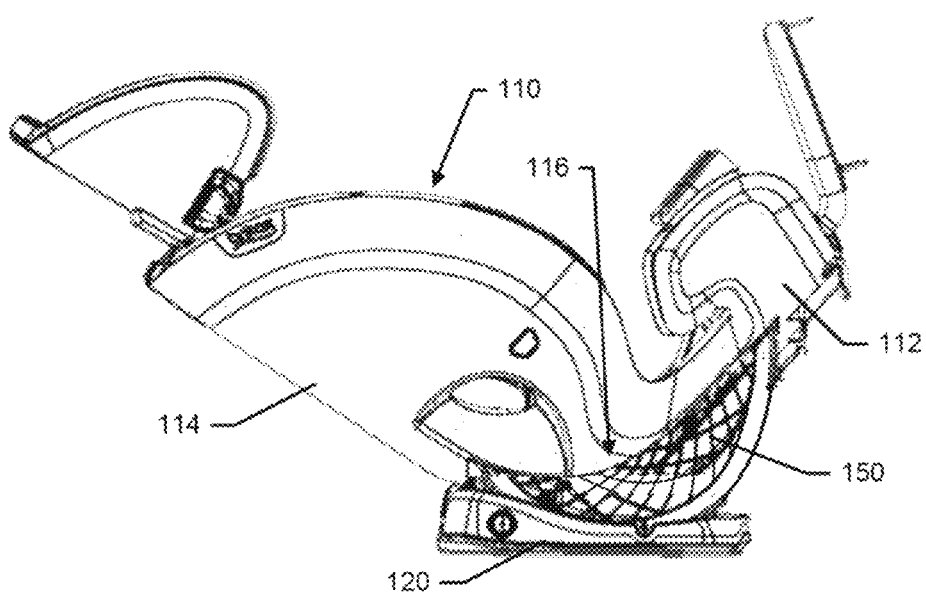
FIG. 5 is a right side view of the child safety seat in the full recline position in accordance with an example embodiment.

FIGS. 2-5 illustrate various views of one example of the structures that may be used to form the child safety seat 100 of an example embodiment. In this regard, FIG. 2 is a front perspective view of the child safety seat 100 and FIG. 3 is a rear perspective view of the child safety seat 100. FIG. 4 is a right side view of the child safety seat 100 of an example embodiment in the no recline position, and FIG. 5 is a right side view of the child safety seat 100 in the full recline position. The child safety seat 100 of FIGS. 2-5 happens to be a forward facing child safety seat with an extendible head rest 102, and which uses a "click-tight" belt tensioning mechanism. However, it should be appreciated that other structures for the child safety seat 100 may alternatively be employed including, for example, infant car seat models, convertible models, combination models, and/or the like, which may include various additional safety or convenience features. The arrangement and positions of various features, accessories and other structures may be altered in accordance with many such designs. Thus, the child safety seat 100 of FIGS. 2-5 should be appreciated as merely being one non-limiting example of a structure that may employ an example embodiment. The specific structures that are unrelated to the multi-functional energy absorber 150 of the child safety seat 100 should therefore also be appreciated as being merely exemplary and non-limiting. Moreover, the padding and fabric coverings of the child safety seat 100 are removed in this example, but could be replaced with any of a number of different padding and/or fabric covering options.

As shown in FIGS. 2-5, the seat shell 110 child safety seat 100 may include at least a seat portion 112 and a back portion 114. The seat portion 112 and the back portion 114 may extend substantially perpendicularly away from an apex 116 at which they meet. When in the no recline position (as shown in FIGS. 2-4), the seat portion 112 may extend substantially horizontally, and the back portion 114 may extend substantially vertically away from the apex 116. Meanwhile, the base 120 may only have a horizontally extending portion that contacts the vehicle seat. The base 120 of this example may therefore only include a portion that extends substantially parallel to the direction of extension of the seat portion 112 when the seat shell 110 is in the no recline position. However, some examples may include a back portion also for the base 120.

In an example embodiment, the multi-functional energy absorber 150 may be rigidly attached to the seat shell 110 such that at least a portion of the multi-functional energy absorber 150 is adjacent to the seat portion 112 and at least a portion of the multi-functional energy absorber 150 is adjacent to the back portion 114. Accordingly, some portion of the multi-functional energy absorber 150 extends past both opposing sides of the apex 116. Meanwhile, the multi-functional energy absorber 150 is operably coupled to the base 120 in a manner that permits sliding engagement therebetween. Thus, when the multi-functional energy absorber 150 slides relative to the base 120, the seat shell 110 pivots or rotates relative to the base 120 such that the seat shell 110 moves to any of a number of positions between the no recline position (shown in FIGS. 2-4) and a full recline position (shown in FIG. 5).

The base 120 may include an operator, e.g., unlock button 122, disposed at a portion thereof. The unlock button 122 may be used to enable the multi-functional energy absorber 150 to be alternately unlocked (e.g., when the unlock button 122 is pressed) and locked (e.g., when the unlock button 122 is not pressed) to enable the seat shell 110 to be rotated between the positions or locked in any given position, respectively. As such, for example, the unlock button 122 may be biased to the locked state, and when the unlocked button 122 is depressed, pushed or otherwise operated/actuated, the biasing member 136 (e.g., a spring) that is used to bias the unlock button 122 to the locked state may be overcome to shift the unlock button 122 to the unlocked state. Although only one unlock button 122 may be necessary, some embodiments may put one instance of the unlock button 122 on each opposing side of the base 120. FIG. 2. shows an instance of the unlock button 122 on the left side of the base 120 and FIG. 4 shows another instance of the unlock button 122 on the right side of the base 120. As will be discussed in greater detail below, the locking assembly 134 of the recline assembly 130 may be configured such that either instance of the unlock button 122 (or both) may be actuated in order to shift to the unlocked state so that the user does not need to have access to any particular side of the base 120 to unlock the locking assembly 134.

Figure 6:
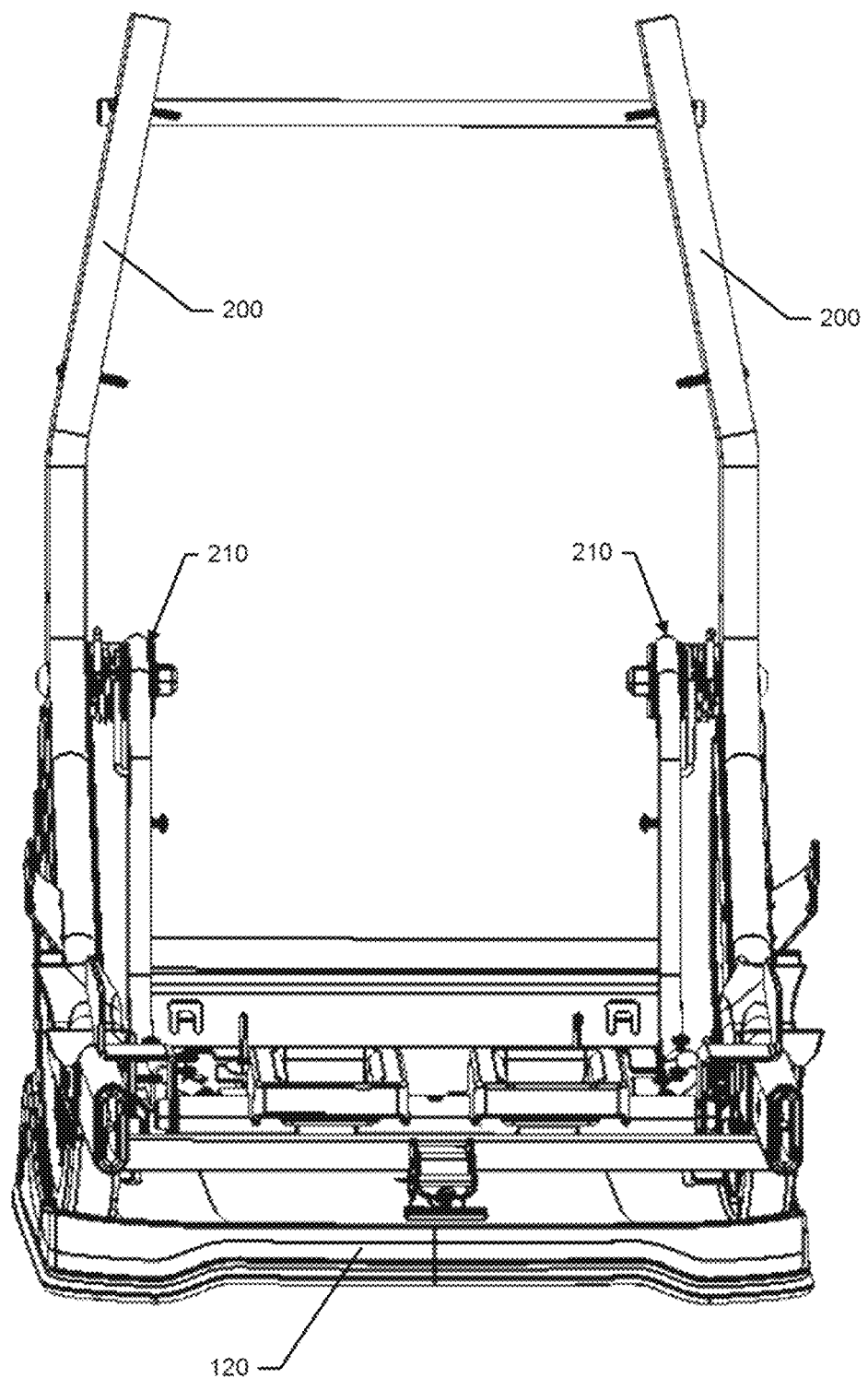
FIG. 6 illustrates a front view of the child safety seat with various portions of the seat shell removed in accordance with an example embodiment.
Figure 7:
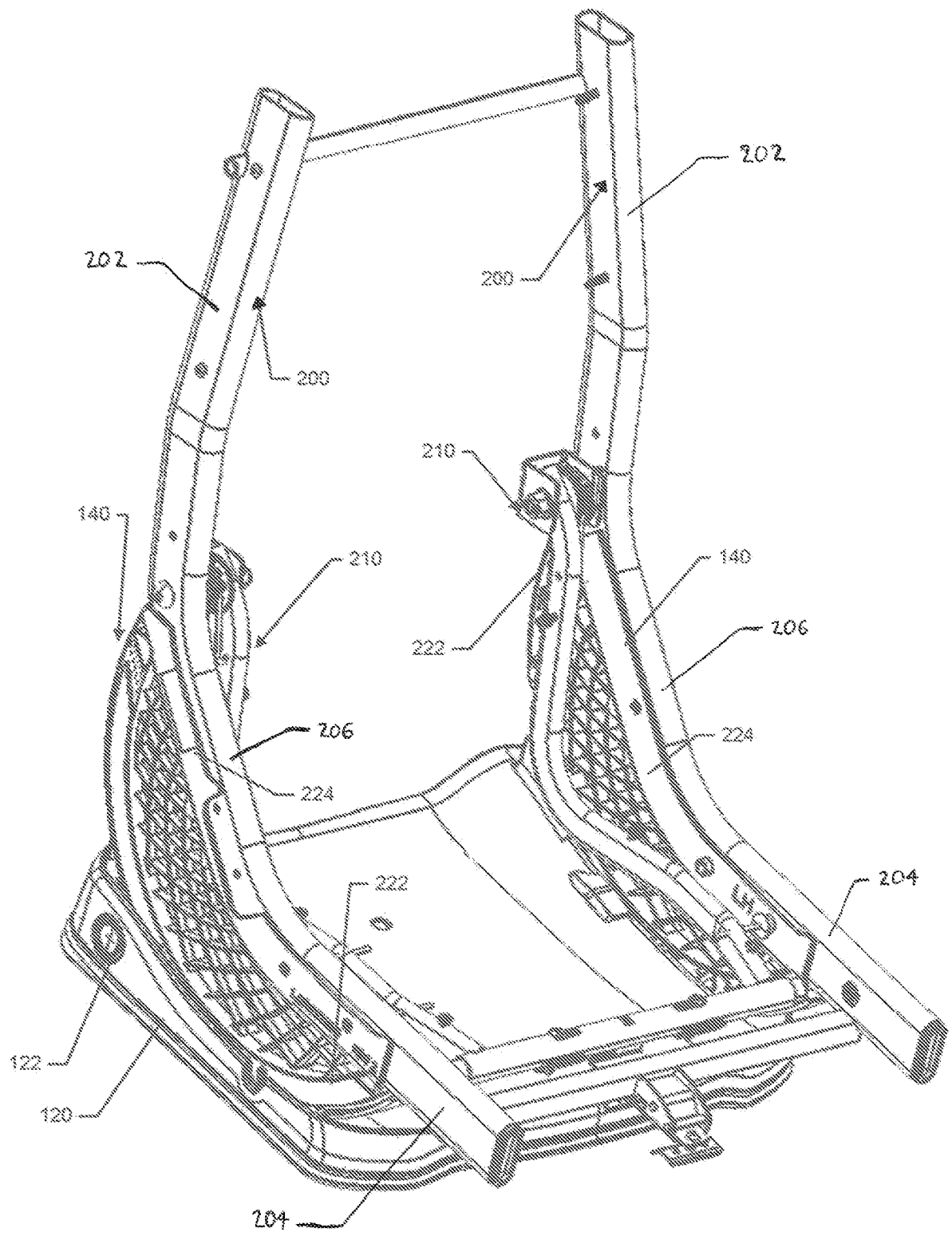
FIG. 7 illustrates a perspective view of the child safety seat with various portions of the seat shell removed in accordance with an example embodiment.

Some specific components that may be used to embody the recline assembly 130 will now be discussed in reference to FIGS. 6-19. In this regard, FIGS. 6-19 illustrate various components or portions of the child safety seat 100 removed to expose certain structural components that can be used to implement various assemblies described herein. However, other structural components configured to operate similarly could alternatively be used in other example embodiments. FIG. 6 illustrates a front view and FIG. 7 illustrates a front perspective view of the child safety seat 100 with various portions of the seat shell 110 removed to expose frame members 200 upon which the seat shell 110 is substantially supported. In this regard, the casing or cover portions and accessories of the seat shell 110 have been removed in FIGS. 6 and 7 to expose the frame members 200. The frame members 200 may be metallic elongate members that are bent at least once (and in this case twice) to form a top section 202 and a bottom section 204 that are substantially perpendicular to each other. In this example, an intermediate section 206 extends between the top section 202 and bottom section 204 to form a transition therebetween by extending at an angle between proximal ends of the top section 202 and the bottom section 204. The apex 116 of the seat shell 110 may be nearest the intermediate section 206, while the seat portion 112 is supported by the bottom section 204 and the back portion 114 is supported by the top section 202.

The frame members 200 may be operably coupled to a pivot assembly 210 that is used to tension the seat belt of the vehicle to secure the child safety seat 100 to the vehicle seat.

The pivot assembly 210 may be pivoted from the position shown in FIGS. 6 and 7 to a position that rotates a distal end of the pivot assembly 210 away from the seat portion 112 to allow the seat belt to be routed between the remainder of the seat portion 112 and the pivot assembly 210. The pivot assembly 210 may then be pivoted toward the seat portion 112 to pinch or otherwise retain the seat belt in a tensioned state between the pivot assembly 210 and the seat portion 112. When the pivot assembly 210 retains the seat belt in a tensioned state, the seat portion 112 and the back portion 114 of the seat shell 110 are each retained under pressure through the multi-directional energy absorber 140 to the vehicle seat via the base 120. Since every possible orientation of the seat shell 110 relative to the seat base 120 has this same relationship of pressure being applied through the multi-directional energy absorber 140, the multi-directional energy absorber 140 effectively provides energy absorption for all possible impacts that could compress any portion of the seat shell 110 toward the base 120. Thus, the multi-directional energy absorber 140 may actually be considered omni-directional since protection is provided for all possible orientations of the seat and directions from which impacts might compress the seat shell 110 relative to the base 120.

In an example embodiment, the frame members 200 may also be rigidly coupled to the multi-directional energy absorber 140. Thus, any movement of the multi-directional energy absorber 140 relative to the base 120 necessarily causes corresponding movement of the seat shell 110 relative to the base 120 since the frame members 200 carry the remaining components of the seat shell 110 with them during any such movement of the frame members 200.

Figure 8:
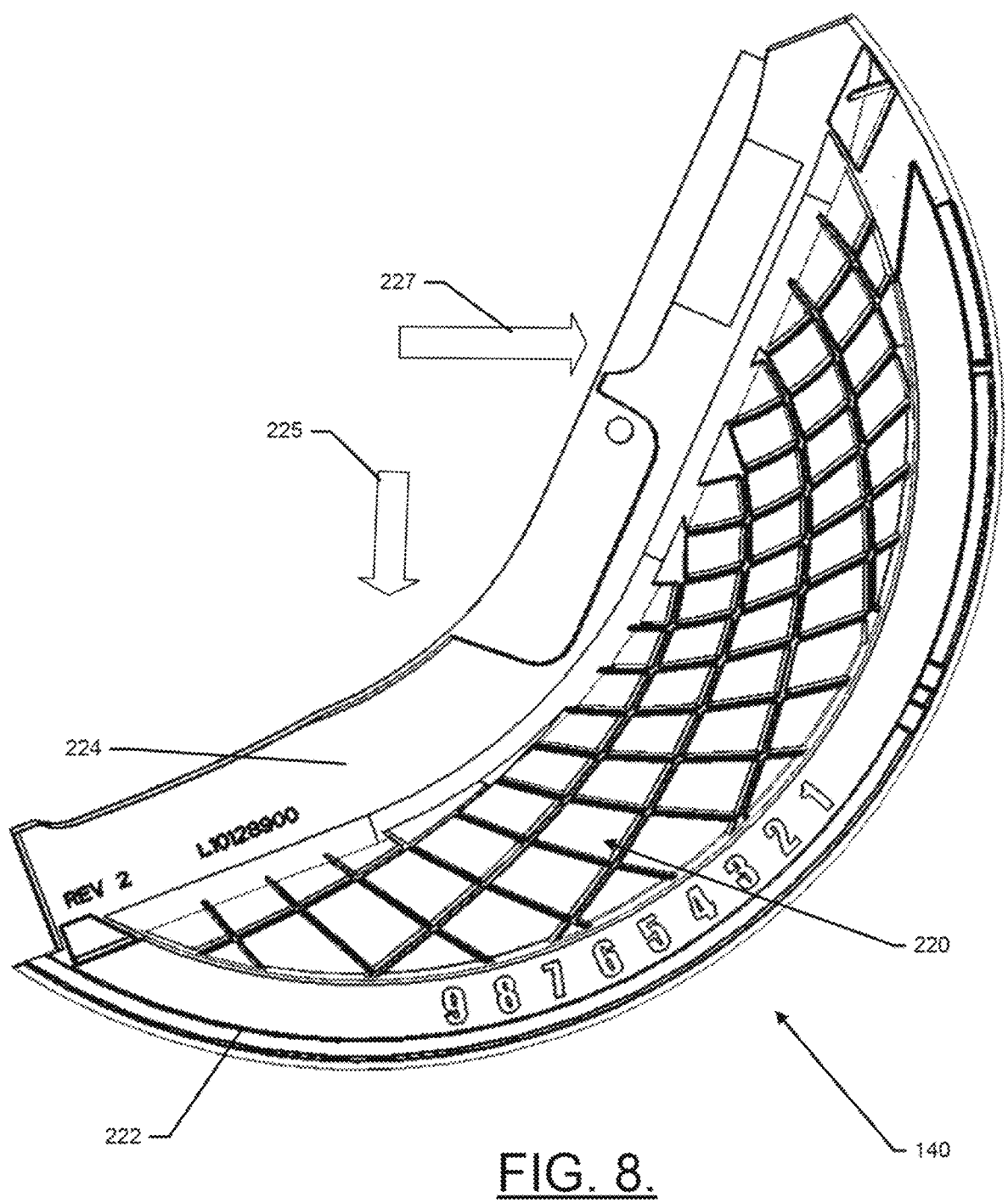
FIG. 8 is a side view of an outer face of a multi-directional energy absorber in accordance with an example embodiment.
Figure 9:
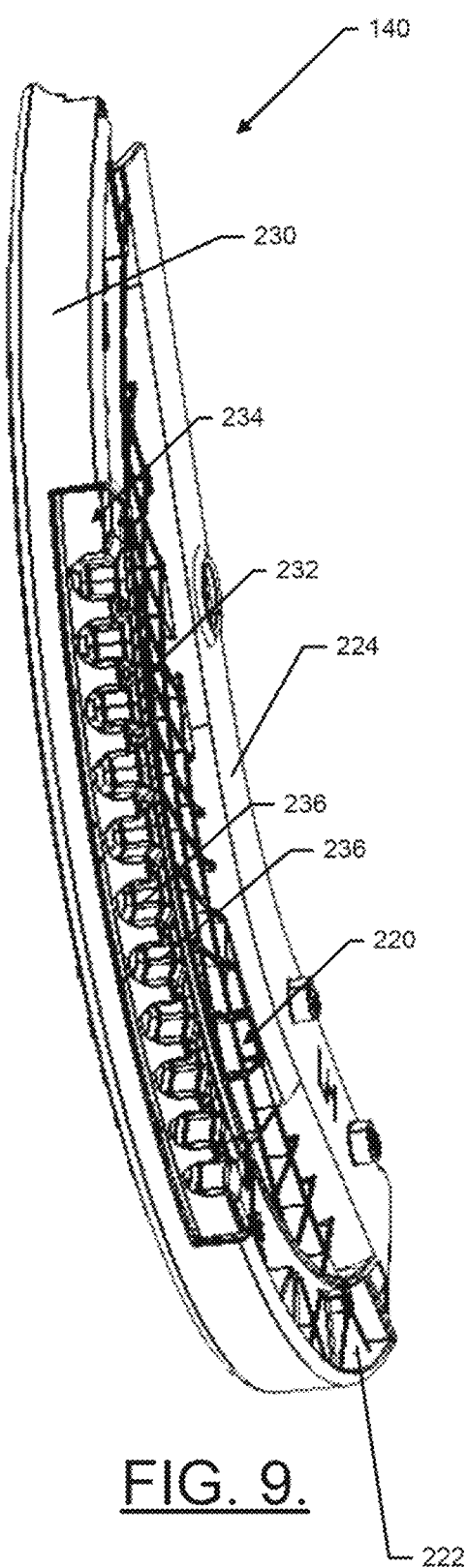
FIG. 9 is a perspective view of an outer periphery of the multi-directional energy absorber in accordance with an example embodiment.
Figure 10:
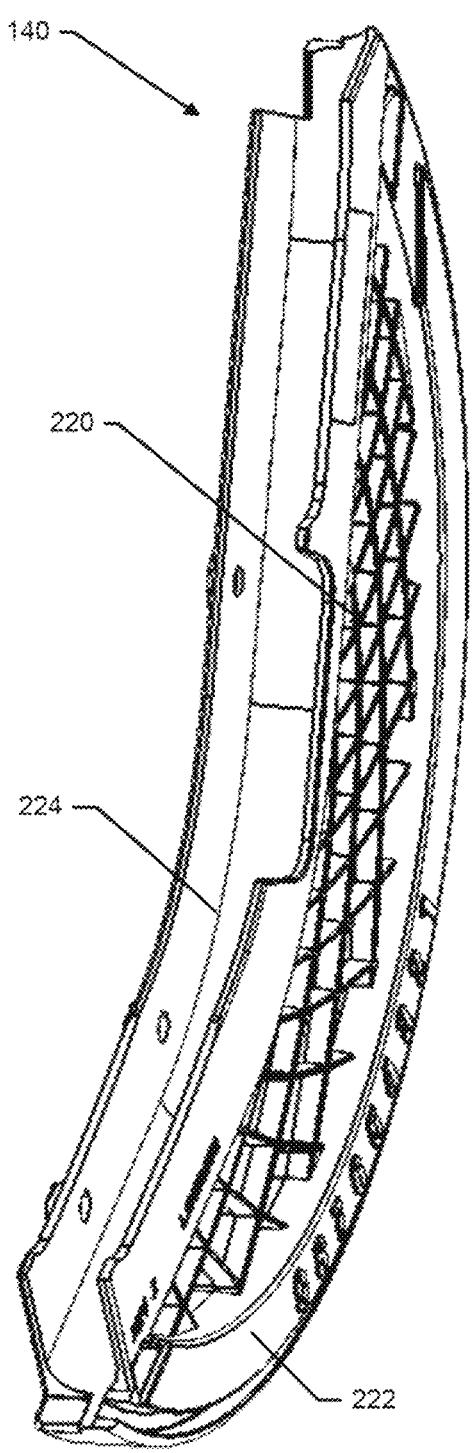
FIG. 10 is a perspective view of a coupling portion of the multi-directional energy absorber for fixing the multi-directional energy absorber to the frame member in accordance with an example embodiment.
Figure 11:
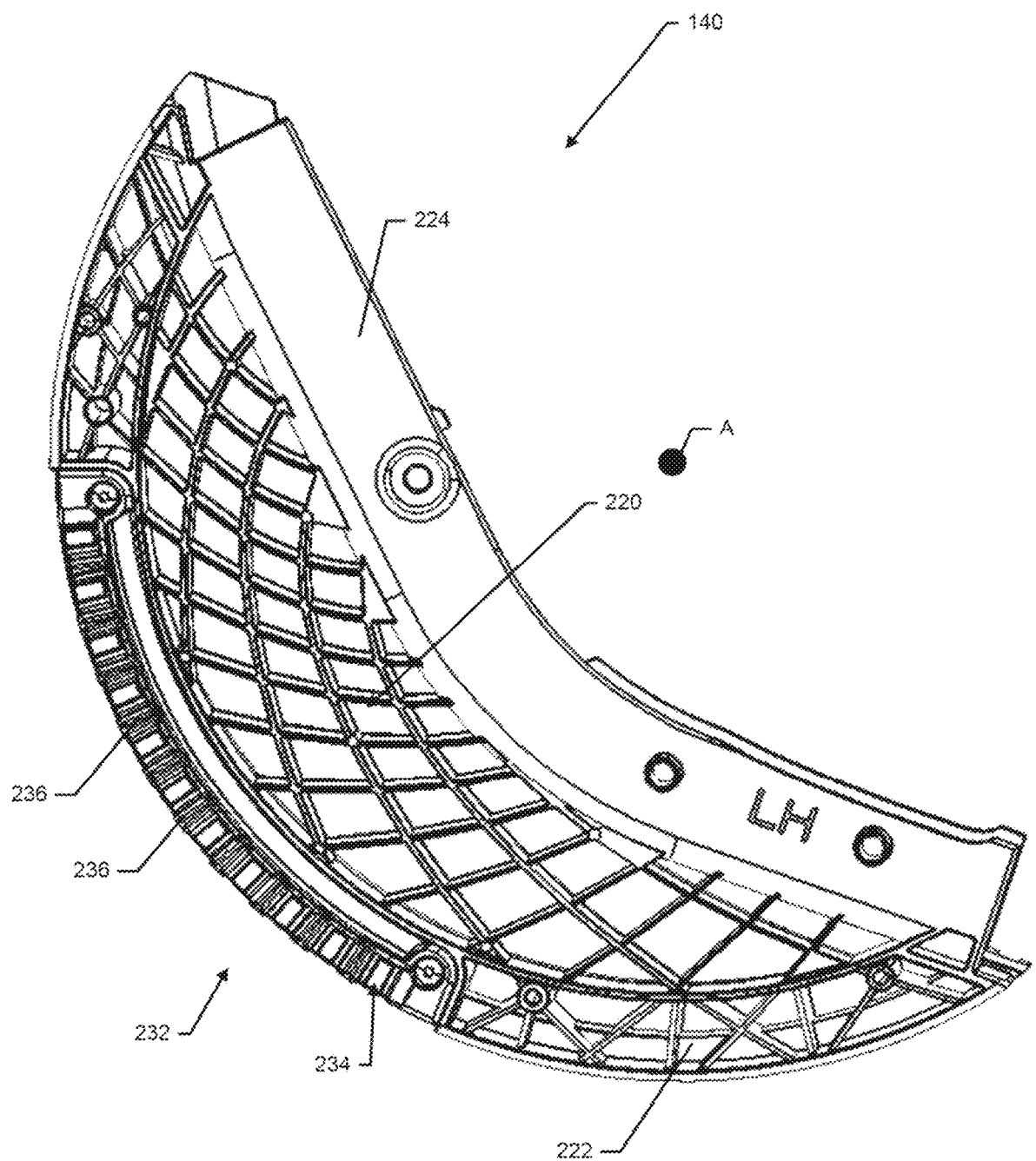
FIG. 11 illustrates a side view of an inner face of the multi-directional energy absorber in accordance with an example embodiment.
Figure 12:
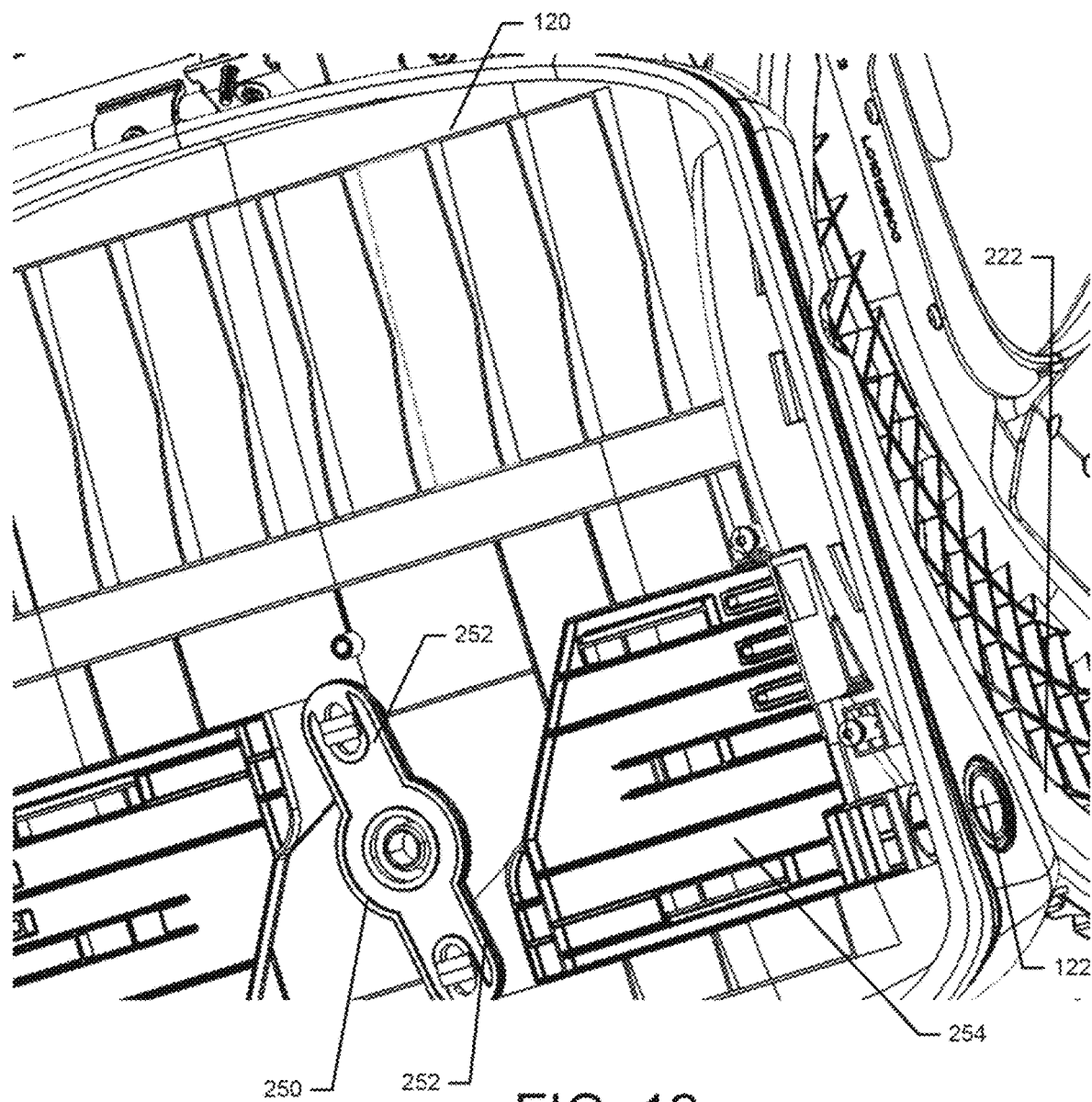
FIG. 12 is a view of portions of the locking assembly internal to the base due to removal of a bottom cover of the base in accordance with an example embodiment.
Figure 13:
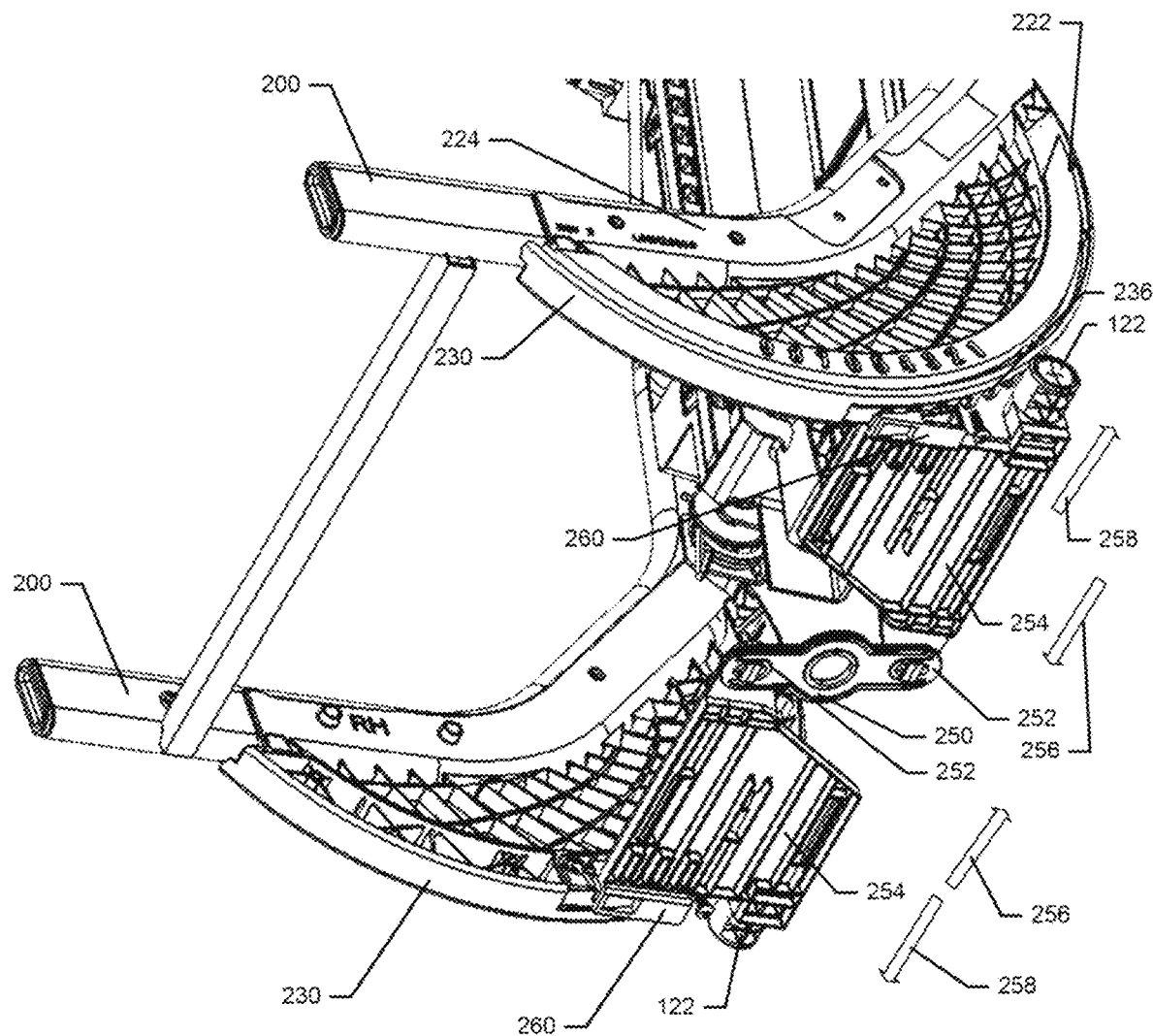
FIG. 13 is a bottom perspective view of various portions of the locking assembly in isolation in accordance with an example embodiment.
Figure 14:
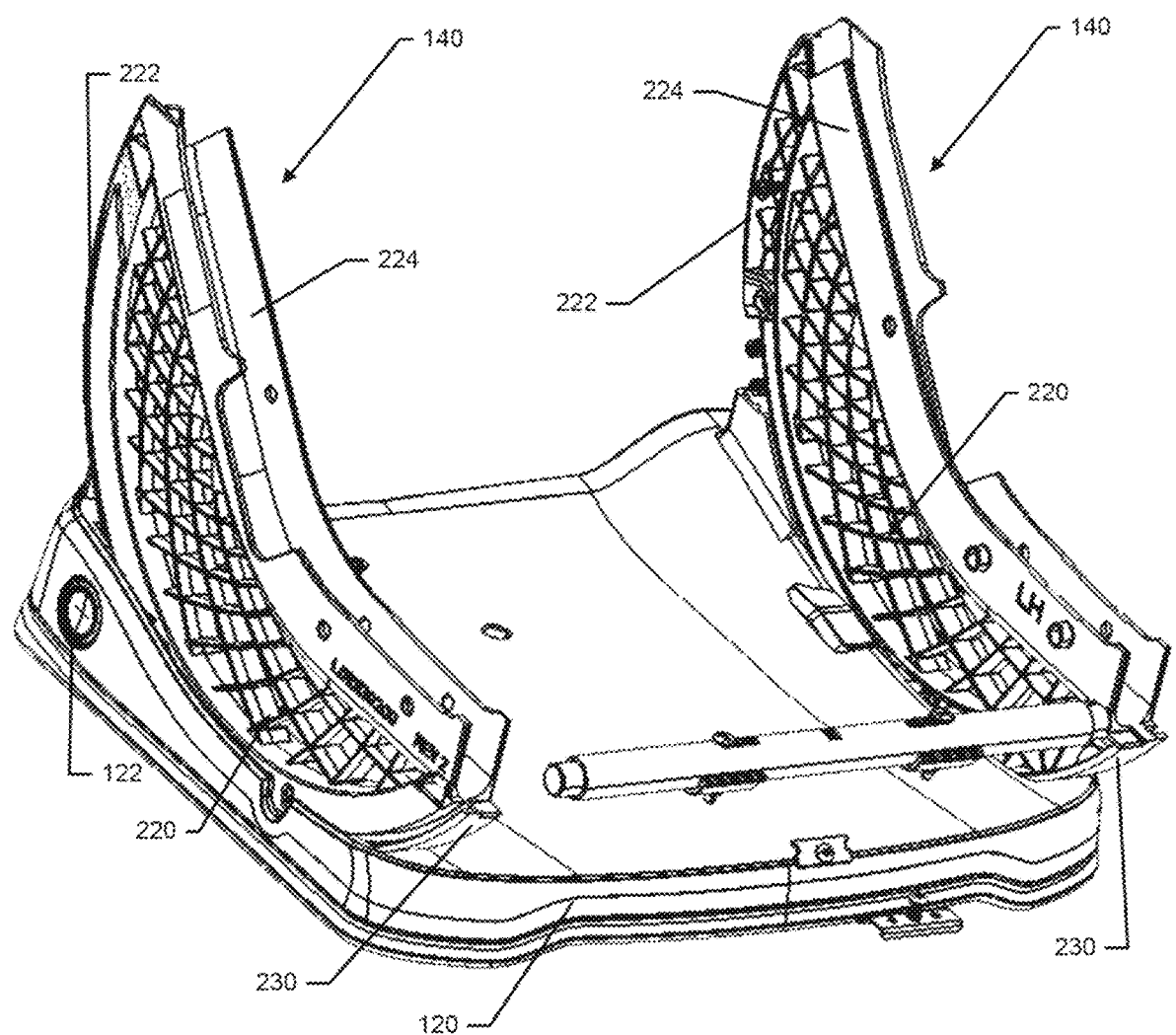
FIG. 14 is a perspective view of the multi-directional energy absorbers disposed on respective support surfaces of the base in accordance with an example embodiment.
Figure 15:
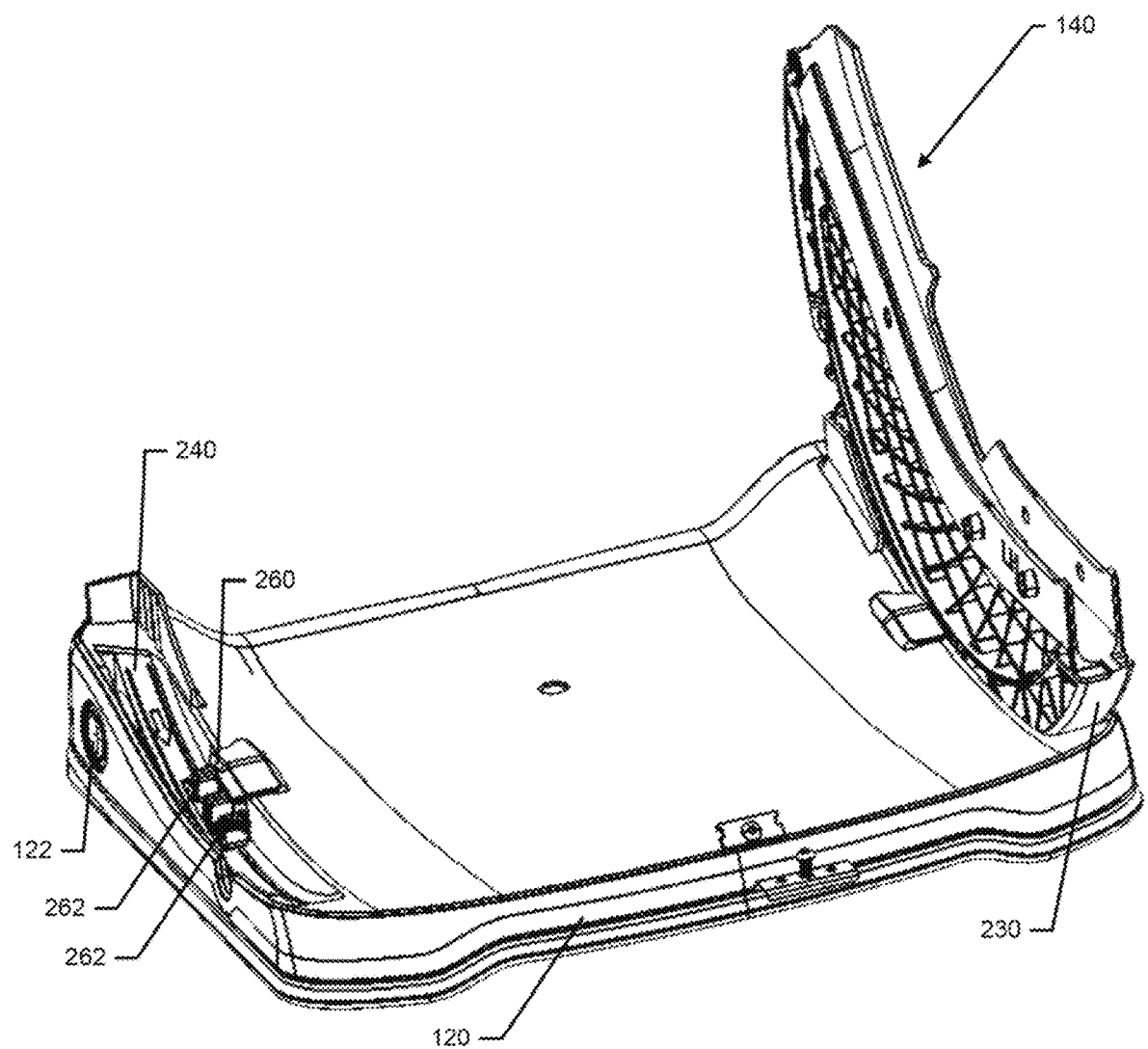
FIG. 15 is a perspective view of the base with one multi-directional energy absorber removed to expose a support surface in accordance with an example embodiment.
Figure 16:
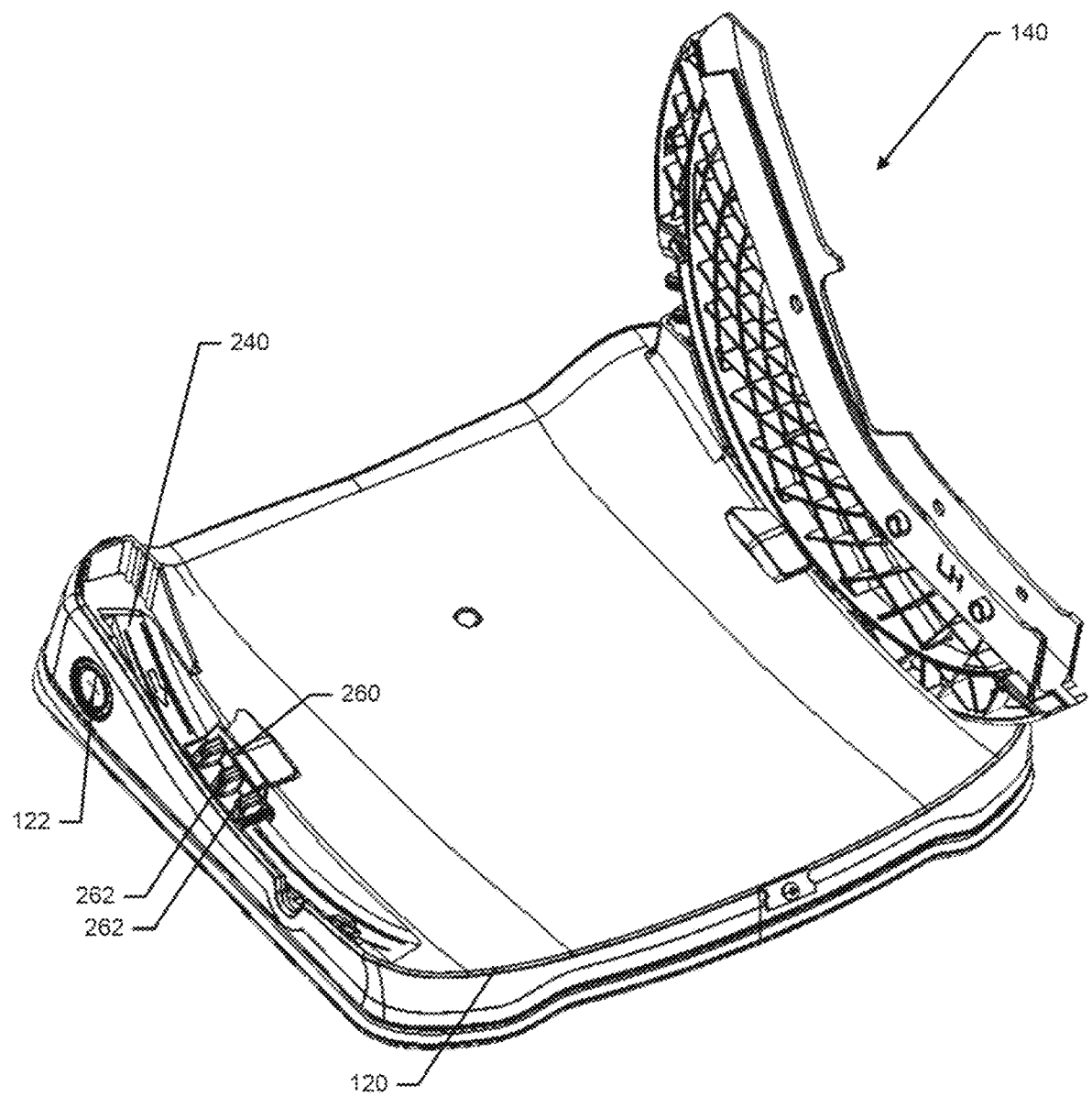
FIG. 16 is another perspective view of the base with one multi-directional energy absorber removed to expose a support surface in accordance with an example embodiment.
Figure 17:
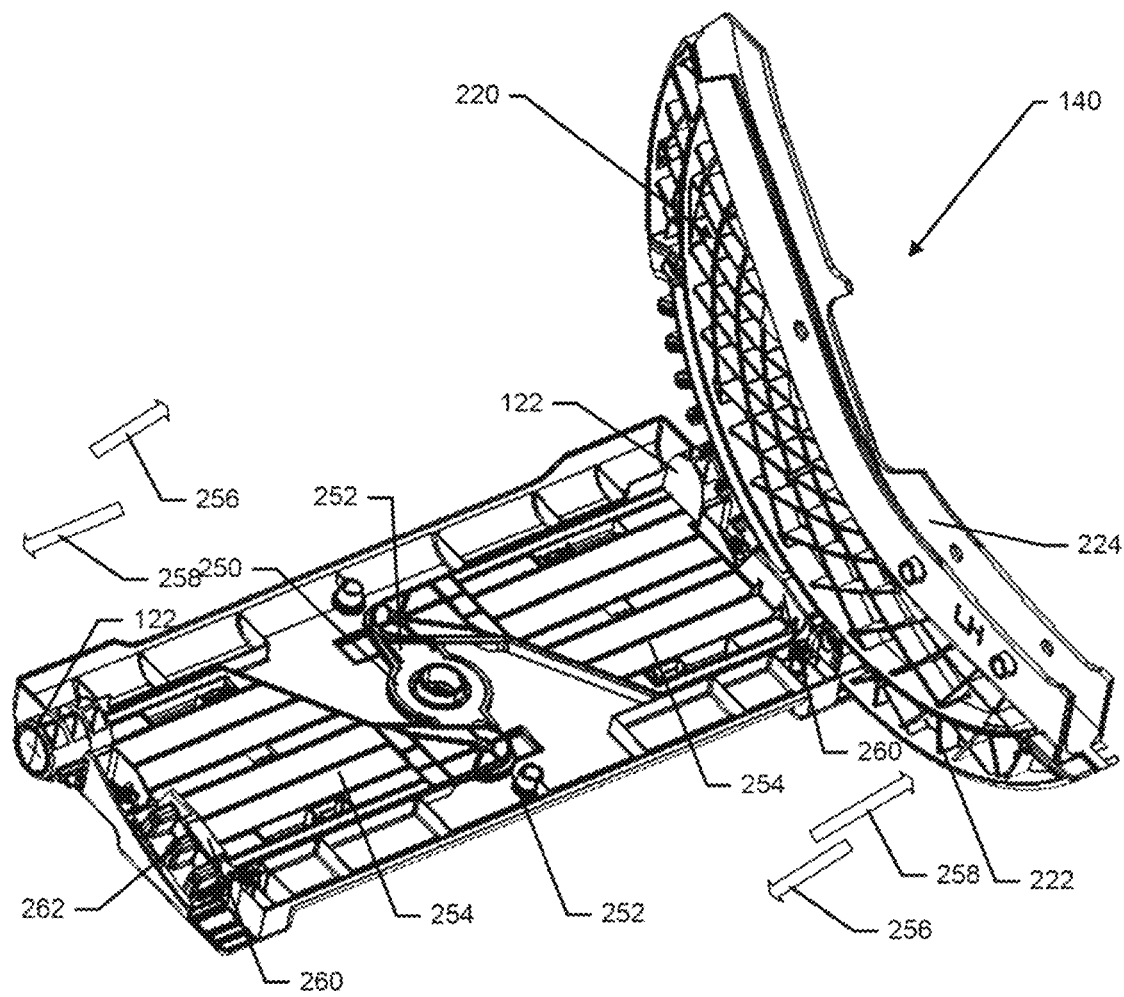
FIG. 17 is a perspective view of one multi-directional energy absorber and both locking slides with the hub attached to a pivot base in accordance with an example embodiment.
Figure 18:
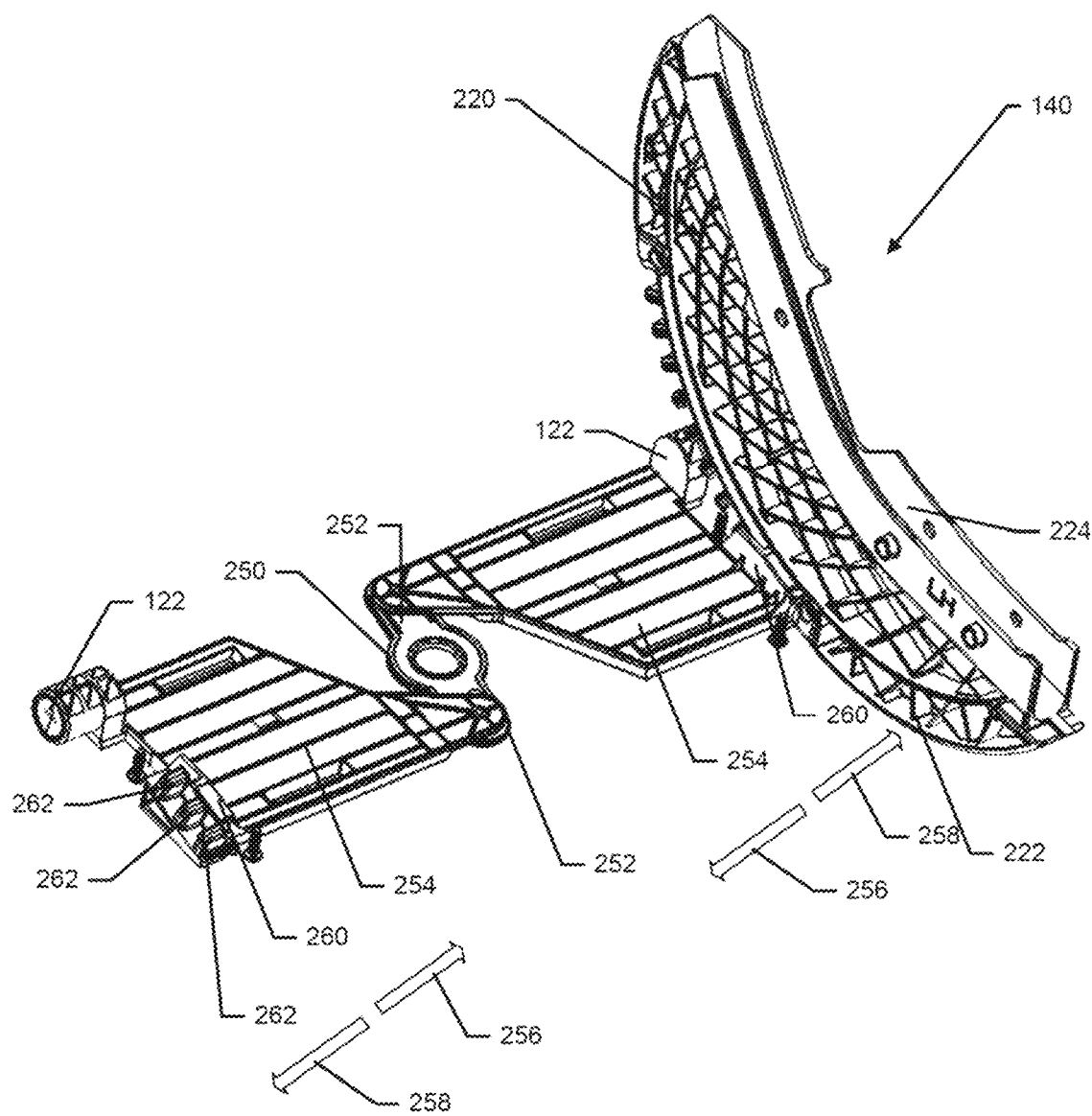
FIG. 18 is a perspective view of the multi-directional energy absorber locking slides of FIG. 17 in isolation in accordance with an example embodiment.
Figure 19:
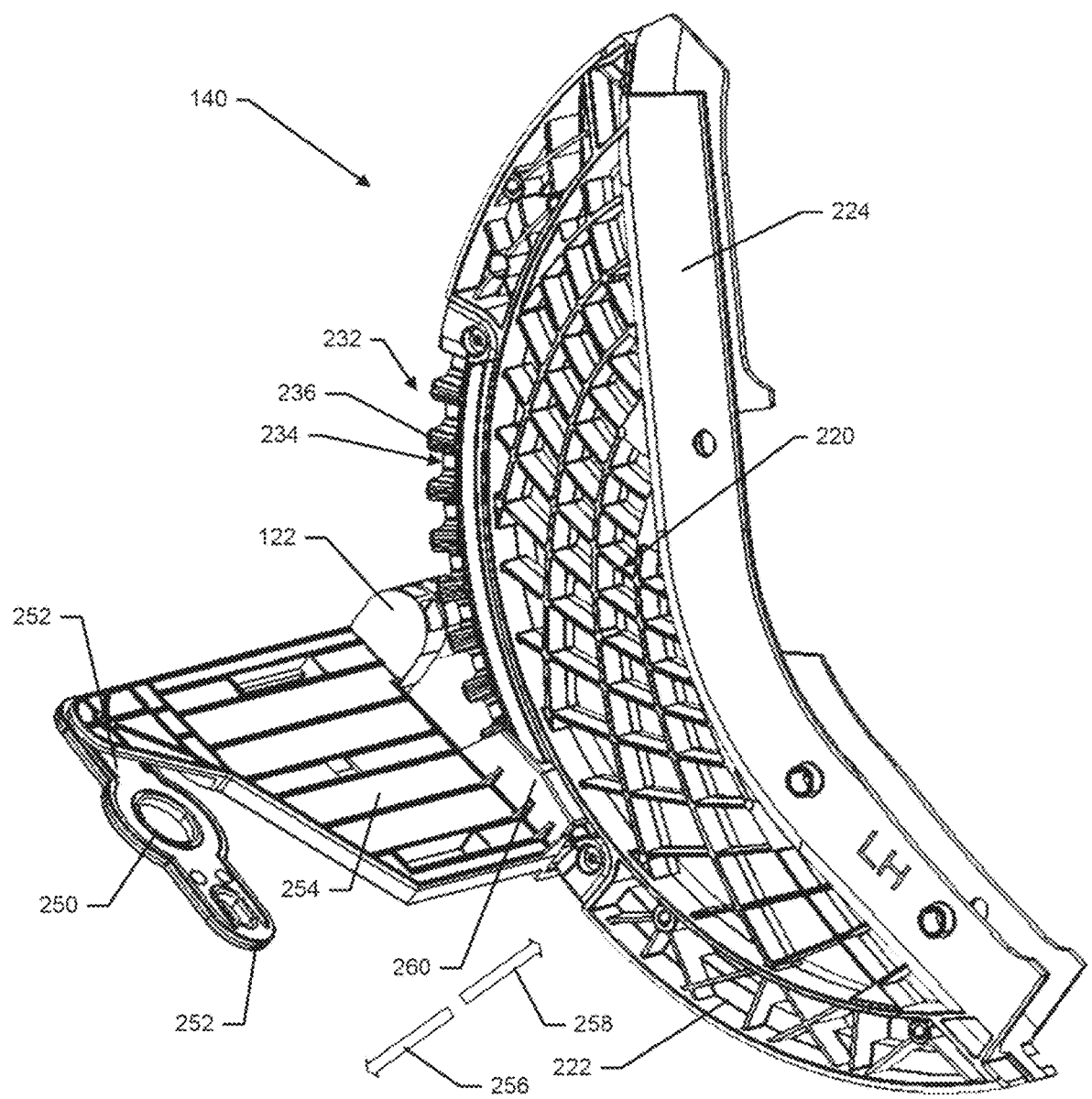
FIG. 19 illustrates a perspective view of one multi-directional energy absorber and its corresponding locking slide in isolation in accordance with an example embodiment.

FIGS. 8-11 illustrate various views of the multi-directional energy absorber 140. In this regard, FIG. 8 is a side view of the outer face of the multi-directional energy absorber 140. FIGS. 9 and 10 illustrate perspective views of an outer periphery of the multi-directional energy absorber 140 and a coupling portion of the multi-directional energy absorber 140 for fixing the multi-directional energy absorber 140 to the frame member 200, respectively. FIG. 11 illustrates a side view of the inner face of the multi-directional energy absorber 140. As shown in FIGS. 8-11, the multi-directional energy absorber 140 includes a plurality of energy absorption cells 220 formed between an arcuate member 222 and a coupling member 224. The energy absorption cells 220 are formed by curvilinear shaped web members that intersect each other. In particular, a first set of web members extend in a first direction (e.g., substantially downwardly), and a second set of web members extend in a second direction (e.g., substantially horizontally). The web members may be made of strips of plastic, resin or other substantially rigid material, but the web members may be made such that the web members can flex or even break before other rigid structures of the seat shell 110 or the base 120 flex or break. As such, upon impact to the seat shell 110, one or more of the web members may flex or break to absorb the energy of the impact.

The angles between the first set of web members and second set of web members are different due to the curvilinear shape of each of the web members such that the sizes of the energy absorption cells 220 are not the same. In general, smaller energy absorption cells are formed at a top portion of the multi-directional energy absorber 140 and larger energy absorption cells are formed at the bottom portion of the multi-directional energy absorber 140. The provision of the multi-directional energy absorber 140 to extend over at least a portion of both the seat portion 112 and the back portion 114 ensures that at least a portion of energy absorbing material (e.g., the energy absorption cells 220) is on both sides of the apex 116. As such, particularly in the no recline position, the multi-directional energy absorber 140 is configured to absorb energy from forces in at least two directions (e.g., the vertical direction as shown by arrow 225 and the horizontal direction as shown by arrow 227). Moreover, the provision of energy absorption cells 220 defines a preferential order for collapse, breakage or flexing of the energy absorption cells 220 since larger cells deform or break before smaller cells. The curvilinear shape, with curvature that bends with an arc inclined in the same direction as the arc defined by the arcuate member 222, further facilitates bend or give in the energy absorption cells 220 before actual breakage occurs when an impact is initially received.

The arcuate member 222 may include a pivot surface 230 disposed about an outer periphery of the arcuate member 222. In this regard, the pivot surface 230 may define a nearly semicircular outer periphery of the multi-directional energy absorber 140. The pivot surface 230 may be a consistent radius distance away from a pivot axis (A) about which the multi-directional energy absorber 140 (and therefore also the seat shell 110) pivots when the seat positioner assembly 132 is used to adjust the position of the seat shell 110 relative to the base 120. In an example embodiment, the pivot surface 230 may be a substantially smooth surface over a majority portion of the outer periphery of the arcuate member 222, and may extend over an entirety of the length of the outer periphery of the arcuate member 222. However, a lock portion 232 may be defined over at least a middle portion of the arcuate member 222 (e.g., spaced apart from opposite ends of the arcuate member 222). The lock portion 232 may be formed as a recessed portion 234 of the pivot surface 230 inside which a plurality of teeth or protrusions 236 are formed. The protrusions 236 may be similar to gear teeth, and may extend no farther than the radius defined from the pivot axis (A) to the pivot surface 230 so that the pivot surface 230 can freely slide over a support surface 240 (see FIGS. 15 and 16) of the base 120. Moreover, in some cases, the protrusions 236 may extend to a length and have a curvature that allows the protrusions 236 to also engage and slide over the support surface 240 when the seat positioner assembly 132 is adjusted. Of note, as shown in FIG. 9, the pivot surface 230 extends continuously from end to end of the arcuate member 222 (including around the recessed portion 234) so that a smooth pivot/slide of the pivot surface 230 over the support surface 240 over all portions of the arcuate member 222. In the region of the recessed portion 234, the recessed portion 234 is proximate to the inner face of the multi-directional energy absorber 140 and the pivot surface 230 is proximate to the outer face of the multi-directional energy absorber 140, extending alongside the recessed portion 234.

The arcuate member 222 and the pivot surface 230 interface with the support surface 240 to define the seat positioner assembly 132. Meanwhile, the lock portion 232, and particularly the protrusions 236, form a portion of the locking assembly 134. The unlock button 122 further defines a portion of the locking assembly 134 along with other components shown in FIGS. 12-19. In this regard, the locking assembly 134 may further include a hub 250 that is anchored to a pivot point within the base 120. The hub 250 may include arms 252 that extend from opposite sides thereof to be operably coupled (at respective distal ends thereof) to a locking slide 254. One instance of the locking slide 234 may therefore be disposed on each opposing side of the base 120 (e.g., to interface with a corresponding instance of the unlock button 122. The locking slides 254 are each configured to slide inwardly (as shown by arrows 256) or outwardly (as shown by arrows 258) based on actuation of the locking assembly 134.

The hub 250, the arms 252, and the locking slides 254 may each be fully enclosed within the base 120. However, the unlock button 122 and a rack member 260 may each be extended outwardly from the outer edges of each of the locking slides 254 to be capable of penetrating the base 120. In this regard, the unlock button 122 may be disposed at one portion of a distal end of the locking slide 254, and the rack member 260 may be disposed at another portion of the distal end of the locking slide 254.

The rack member 260 may include teeth or projections 262 that extend from the locking slide 254 to engage the protrusions 236 of the lock portion 232 when the locking slide 254 is in the extended position (responsive to movement outward in the direction shown by arrows 258). However, the projections 262 may disengage from the protrusions 236 of the lock portion 232 when the locking slide 254 is in the retracted position (responsive to movement inward in the direction shown by arrows 256).

In an example embodiment, the biasing member 136 may push against a rear (or inner) portion of the unlock button 122 to bias the locking slide 254 outwardly (e.g., in the direction shown by arrows 258). Thus, the locking slide 254 may be biased outwardly to cause the projections 262 to be inserted between corresponding protrusions 236 to lock the position of the multi-directional energy absorber 140 (and therefore also the seat shell 110) relative to the base 120. However, when either one of the unlock buttons 122 is actuated or depressed, the unlock button 122 moves the corresponding locking slide 254 inwardly (as shown by arrows 256). Inward motion of the locking slide 254 of either side pushes the projections 262 out of engagement with the protrusions 236 on the corresponding locking slide 254. Such inward motion also causes rotation of the hub 250 (as shown by arrow 270). Rotation of the hub 250 also rotates the arms 252 so that the locking slide 254 on the side opposite the locking button 122 that was depressed is also drawn inwardly. The projections 262 on the locking slide 254 opposite the locking button 122 that was depressed are then also carried inwardly to be taken out of contact with the protrusions 236. The lock portion 232 is then no longer locked to the base 120, and the pivot surface 230 is allowed to slide over the support surface 240 of the base 120. The multi-directional energy absorber 140 (and therefore also the seat shell 110) can therefore be positioned relative to the base 120 to any desirable orientation between the full recline and no recline positions. Once a particular position/orientation is selected, the locking button 122 can be released so that the biasing member 136 returns the locking slides 254 on each side to their normal (extended) position to lock the locking assembly 134, and thereby also lock the multi-directional energy absorber 140 (and therefore also the seat shell 110) relative to the base 120.

Thus, according to an example embodiment, a child safety seat is provided. The child safety seat may include a base configured to be operably coupled to a vehicle seat, a seat shell configured to receive and secure a child therein, and a multi-functional energy absorber. The seat shell may be operably coupled to the base such that the seat shell is alternately movable between a plurality of positions relative to the base responsive to operation of a seat positioner assembly, and lockable in the plurality of positions relative to the base responsive to operation of a locking assembly. The multi-functional energy absorber may be disposed between the base and the seat shell. The multi-functional energy absorber may be an integral portion of both the seat positioner assembly and the locking assembly.

In some embodiments, the features described above may be augmented or modified, or additional features may be added. These augmentations, modifications and additions may be optional and may be provided in any combination. Thus, although some example modifications, augmentations and additions are listed below, it should be appreciated that any of the modifications, augmentations and additions could be implemented individually or in combination with one or more, or even all of the other modifications, augmentations and additions that are listed. As such, for example, the seat shell may include a frame having frame members. The frame members of the seat shell may be fixed to the multi-functional energy absorber at a coupling member. The multi-functional energy absorber may also include an arcuate member disposed opposite the coupling member. The arcuate member may be configured to slidingly engage a support surface of the base when the locking assembly is in an unlocked state. In an example embodiment, the arcuate member may include a pivot surface continuously extending from a first end of the arcuate member to a second end of the arcuate member. The pivot surface and the support surface may define the seat positioner assembly. A lock portion may be defined at a portion of the arcuate member spaced apart from the first and second ends of the arcuate member. The lock portion may be configured to interface with a rack member of the base to enable locking of the arcuate member relative to the base in a locked state. In some cases, the rack member may extend from a locking slide disposed in the base. The locking slide may be biased to the locked state. An actuator may be disposed at a side of the base to enable the locking slide to be moved to the unlocked state by overcoming bias applied to the locking slide. In an example embodiment, the actuator may be one of two actuators disposed on opposite sides of the base, where each of the two actuators is operably coupled to separate instances of the locking slide and each of the separate instances of the locking slide engages a corresponding separate instance of the multi-functional energy absorber. In such an example, depressing either one of the actuators may cause each of the separate instances of the locking slide to be retracted from engagement with the corresponding separate instance of the multi-functional energy absorber to move the locking assembly to the unlocked state. In some cases, the multi-functional energy absorber may include a multi-directional energy absorber configured to absorb impact energy in at least two directions substantially perpendicular to each other. In an example embodiment, the seat shell may include a seat portion and a back portion that are joined to each other at an apex and extend away from each other in directions substantially perpendicular to each other. A portion of the multi-directional energy absorber may be disposed on each opposing side of the apex. In some cases, the multi-directional energy absorber may include curvilinear shaped web members that intersect each other to define energy absorption cells. Energy absorption cells on one side of the apex are larger than energy absorption cells on the other side of the apex. Alternatively or additionally, a size of the energy absorption cells decreases as distance from the apex increases in one direction moving away from the apex, and a size of the energy absorption cells increases as distance from the apex increases in the other direction moving away from the apex.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A child safety seat comprising:
a base configured to be operably coupled to a vehicle seat;
a seat shell configured to receive and secure a child therein, the seat shell being operably coupled to the base such that the seat shell is alternately movable between, and lockable in, a plurality of positions relative to the base; and
an energy absorber disposed between the base and the seat shell, the energy absorber including curvilinear shaped web members and a plurality of protrusions,
wherein the energy absorber is configured to:
deform via the curvilinear shaped web members such that the energy absorber absorbs impact energy,
provide a sliding support surface for the seat shell to enable the seat shell to be movable between the plurality of positions relative to the base, and
enable locking of the seat shell in selected ones of the plurality of positions relative to the base via the plurality of protrusions of the energy absorber,
wherein the energy absorber is arranged relative to the base and the seat shell such that the energy absorber deforms to absorb impact energy resulting from impacts to the child safety seat in a plurality of directions.

2. The child safety seat of claim 1, wherein the seat shell comprises a seat portion and a back portion that are joined to each other at an apex and extend away from each other in directions substantially perpendicular to each other, and
wherein a portion of the energy absorber is disposed on each opposing side of the apex.

3. The child safety seat of claim 2, wherein the energy absorber comprises curvilinear shaped web members that intersect each other to define energy absorption cells, and
wherein energy absorption cells on one side of the apex are larger than energy absorption cells on the other side of the apex.

4. The child safety seat of claim 1, wherein the energy absorber is arranged relative to the base and seat shell such that the energy absorber absorbs impact energy resulting from an impact to the child safety seat in a first direction and resulting from an impact to the child safety seat in a second direction, the first and second directions being substantially perpendicular to each other.

5. The child safety seat of claim 1, wherein the seat shell is movable between the plurality of positions relative to the base responsive to operation of a seat positioner assembly, and lockable in the plurality of positions relative to the base responsive to operation of a locking assembly, and
wherein the energy absorber is an integral portion of both the seat positioner assembly and the locking assembly.

6. A child safety seat comprising:
a base configured to be operably coupled to a vehicle seat;
a seat shell configured to receive and secure a child therein, the seat shell being operably coupled to the base such that the seat shell is alternately movable between a plurality of positions relative to the base responsive to operation of a seat positioner assembly, and lockable in the plurality of positions relative to the base responsive to operation of a locking assembly; and
an energy absorber disposed between the base and the seat shell, the energy absorber including curvilinear shaped web members, and the energy absorber configured to deform via the curvilinear shaped web members such that the energy absorber absorbs impact energy resulting from impacts to the child safety seat,
wherein the energy absorber is an integral portion of both the seat positioner assembly and the locking assembly.

7. The child safety seat of claim 6, wherein the seat shell comprises a frame including frame members,
wherein the frame members of the seat shell are fixed to the energy absorber at a coupling member, and
wherein the energy absorber comprises an arcuate member disposed opposite the coupling member, the arcuate member being configured to slidingly engage a support surface of the base when the locking assembly is in an unlocked state.

8. The child safety seat of claim 7, wherein the arcuate member comprises a pivot surface continuously extending from a first end of the arcuate member to a second end of the arcuate member,
wherein the pivot surface and the support surface define the seat positioner assembly, and
wherein a lock portion is defined at a portion of the arcuate member spaced apart from the first and second ends of the arcuate member, the lock portion being configured to interface with a rack member of the base to enable locking of the arcuate member relative to the base in a locked state.

9. The child safety seat of claim 8, wherein the rack member extends from a locking slide disposed in the base, the locking slide being biased to the locked state, wherein an actuator is disposed at a side of the base to enable the locking slide to be moved to the unlocked state by overcoming bias applied to the locking slide.

10. The child safety seat of claim 9, wherein the actuator is one of two actuators disposed on opposite sides of the base,
wherein each of the two actuators is operably coupled to separate instances of the locking slide,
wherein each of the separate instances of the locking slide engages a corresponding separate instance of the energy absorber, and
wherein depressing either one of the actuators causes each of the separate instances of the locking slide to be retracted from engagement with the corresponding separate instance of the energy absorber to move the locking assembly to the unlocked state.

11. A multi-directional energy absorber for a child safety seat, the multi-directional energy absorber comprising:
a coupling member configured to be affixed to a frame of a seat shell of the child safety seat; and
an arcuate member operably coupled to the coupling member at respective opposing ends thereof, the arcuate member being configured to slidingly engage a support surface of thea base of the child safety seat when the child safety seat is in an unlocked state, wherein the arcuate member includes a plurality of protrusions along a portion of a length of the arcuate member,
wherein the multi-directional energy absorber is configured to be locked at a selected position of a plurality of discrete positions relative to the base responsive to affixing a portion of the base to a protrusion of the arcuate member in a locked state,
wherein the multi-directional energy absorber is configured to deform such that the multi-functional energy absorber absorbs impact energy from forces in more than one direction.

12. The multi-directional energy absorber of claim 11, wherein the seat shell comprises a seat portion and a back portion that are joined to each other at an apex and extend away from each other in directions substantially perpendicular to each other, and
wherein the multi-directional energy absorber is configured such that a portion of the multi-directional energy absorber is disposed on each opposing side of the apex when the coupling member is affixed to the frame of the seat shell.

13. The multi-directional energy absorber of claim 12, wherein the multi-directional energy absorber comprises curvilinear shaped web members that intersect each other to define energy absorption cells formed in a space between the coupling member and the arcuate member, and
wherein energy absorption cells on one side of the apex are larger than energy absorption cells on the other side of the apex.

14. The multi-directional energy absorber of claim 12, wherein the multi-directional energy absorber comprises curvilinear shaped web members that intersect each other to define energy absorption cells formed in a space between the coupling member and the arcuate member, and
wherein a size of the energy absorption cells decreases as distance from the apex increases in one direction moving away from the apex, and a size of the energy absorption cells increases as distance from the apex increases in the other direction moving away from the apex.

15. The multi-directional energy absorber of claim 11, wherein the multi-directional energy absorber is configured to deform in more than one direction such that it absorbs impact energy from a force in a first direction and from a force in a second direction, the first and second directions being substantially perpendicular to each other.

16. The multi-directional energy absorber of claim 11, wherein the portion of the length of the arcuate member including the plurality of protrusions is recessed relative to another portion of the length of the arcuate member.

17. A child safety seat comprising:
a base configured to be operably coupled to a vehicle seat;
a seat shell configured to receive and secure a child therein, the seat shell being operably coupled to the base such that the seat shell is alternately movable between, and lockable in, a plurality of positions relative to the base; and
an energy absorber disposed between the base and the seat shell,
wherein the energy absorber is configured to:
deform such that the energy absorber absorbs impact energy,
provide a sliding support surface for the seat shell to enable the seat shell to be movable between the plurality of positions relative to the base, and
enable locking of the seat shell in selected ones of the plurality of positions relative to the base,
wherein the energy absorber is arranged relative to the base and the seat shell such that the energy absorber deforms to absorb impact energy resulting from impacts to the child safety seat in a plurality of directions,
wherein the seat shell comprises a seat portion and a back portion that are joined to each other at an apex and extend away from each other in directions substantially perpendicular to each other, wherein a portion of the energy absorber is disposed on each opposing side of the apex,
wherein the energy absorber comprises curvilinear shaped web members that intersect each other to define energy absorption cells, and
wherein a size of the energy absorption cells decreases as a distance from the apex increases in a first direction moving away from the apex, and a size of the energy absorption cells increases as a distance from the apex increases in a second direction moving away from the apex, the second direction being opposite the first direction.

18. A child safety seat comprising:
a base configured to be operably coupled to a vehicle seat;
a seat shell configured to receive and secure a child therein, the seat shell being operably coupled to the base such that the seat shell is alternately movable between a plurality of positions relative to the base responsive to operation of a seat positioner assembly, and lockable in the plurality of positions relative to the base responsive to operation of a locking assembly; and
an energy absorber disposed between the base and the seat shell, the energy absorber configured to deform such that the energy absorber absorbs impact energy resulting from impacts to the child safety seat, wherein the energy absorber is arranged relative to the base and the seat shell such that the energy absorber absorbs impact energy resulting from an impact to the child safety seat in a first direction and resulting from an impact to the child safety seat in a second direction, the first and second directions being substantially perpendicular to each other,
wherein the energy absorber is an integral portion of both the seat positioner assembly and the locking assembly,
wherein the seat shell comprises a seat portion and a back portion that are joined to each other at an apex and extend away from each other in directions substantially perpendicular to each other, wherein a portion of the energy absorber is disposed on each opposing side of the apex,
wherein the energy absorber comprises curvilinear shaped web members that intersect each other to define energy absorption cells, and wherein energy absorption cells on one side of the apex are larger than energy absorption cells on the other side of the apex.

\* \* \* \* \*